(12) United States Patent
Shibata et al.

(10) Patent No.: US 6,889,795 B2
(45) Date of Patent: May 10, 2005

(54) ELECTRIC POWER STEERING DEVICE

(75) Inventors: Hirotaka Shibata, Kariya (JP); Mikio Suzuki, Hekinan (JP); Osamu Watanabe, Okazaki (JP); Masanari Torii, Okazaki (JP); Susumu Honaga, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 7 days.

(21) Appl. No.: 10/671,248

(22) Filed: Sep. 24, 2003

(65) Prior Publication Data
US 2004/0094352 A1 May 20, 2004

(30) Foreign Application Priority Data
Sep. 30, 2002 (JP) ........................................ 2002-287577

(51) Int. Cl.[7] .................................................. B62D 5/04
(52) U.S. Cl. .................................. 180/444; 74/388 PS
(58) Field of Search ................................ 180/443–446, 180/400; 74/424.81, 388 PS, 424.71

(56) References Cited

U.S. PATENT DOCUMENTS

| | | | | |
|---|---|---|---|---|
| 5,445,237 A | * | 8/1995 | Eda et al. .................... | 180/444 |
| 5,870,928 A | | 2/1999 | Genter et al. | |
| 6,155,376 A | * | 12/2000 | Cheng ........................ | 180/444 |
| 6,702,060 B2 | * | 3/2004 | Tatewaki et al. ............. | 180/444 |
| 6,705,176 B2 | * | 3/2004 | Ishii et al. ............... | 74/388 PS |
| 2004/0045386 A1 | * | 3/2004 | Saruwatari et al. ..... | 74/388 PS |
| 2004/0050614 A1 | * | 3/2004 | Yoshida et al. ............. | 180/444 |

FOREIGN PATENT DOCUMENTS

WO  WO-03/006301 A1  1/2003

OTHER PUBLICATIONS

Patent Abstracts of Japan for JP2000–280923 published on Oct. 10, 2000.
Patent Abstracts of Japan for JP2000–280920 published on Oct. 10, 2000.

* cited by examiner

*Primary Examiner*—Avraham Lerner
(74) *Attorney, Agent, or Firm*—Darby & Darby (57) ABSTRACT

An electric power steering device in which a motor shaft and a rack bar form a diagonal intersection. The power transmission includes: a drive gear rotating in tandem with the motor shaft and forming a bevel gear with linearly extending teeth; a ball screw mechanism disposed co-axial with the rack bar and converting a rotational motion to a linear motion; and a driven gear rotating in tandem with a nut of the ball screw mechanism, meshing with and moving in tandem with the drive gear, and forming a bevel gear with linearly extending teeth. The drive gear and/or the driven gear can be adjusted so that backlash between the two elements can be adjusted in a continuous, non-stepped manner.

30 Claims, 8 Drawing Sheets

Prior Art

ELECTRIC POWER STEERING DEVICE

BACKGROUND OF THE INVENTION

1. Field of the Invention

The present invention relates to an electric power steering device.

2. Discussion of the Related Art

Figure 8:
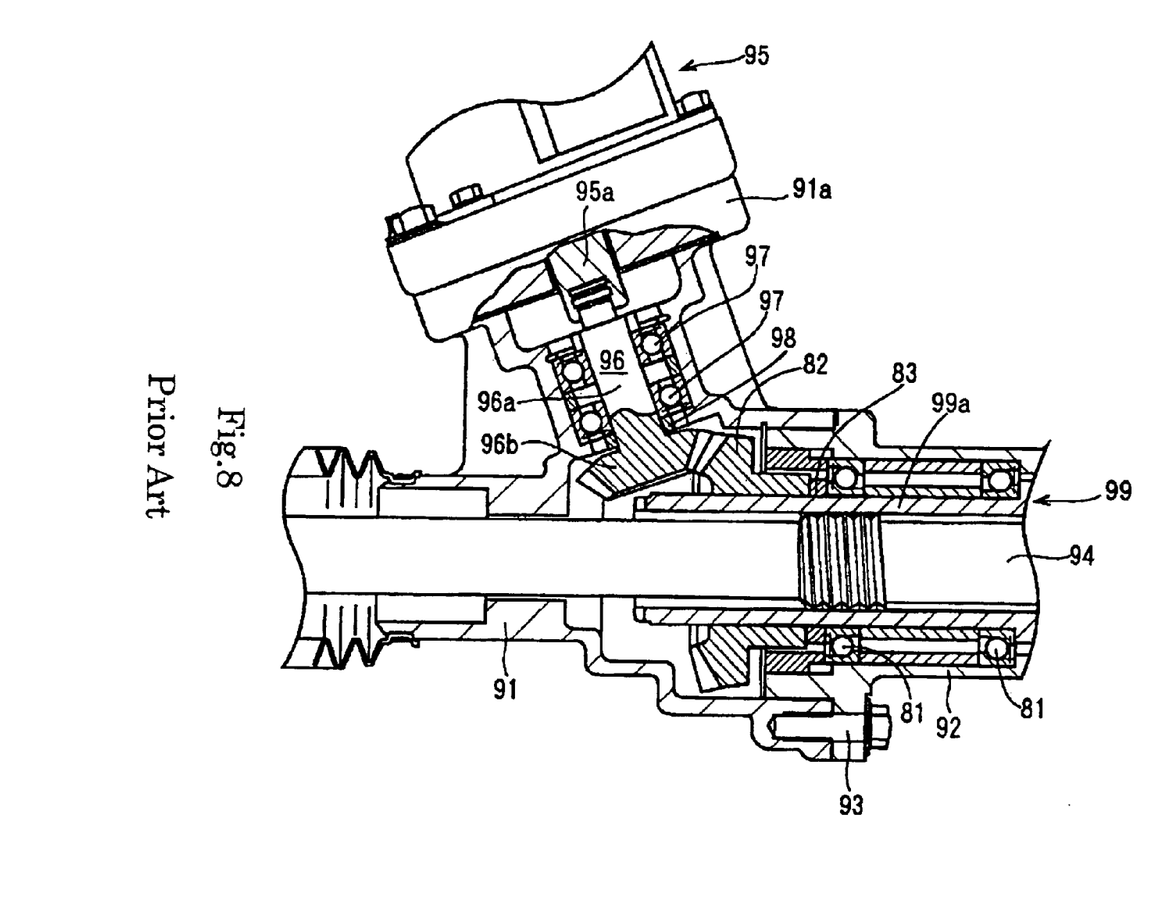
FIG. 8 is a cross-section drawing of a conventional electric power steering device.

FIG. 8 illustrates a conventional electric power steering device as described in Japanese laid-open patent publication number 2000-280920 and Japanese laid-open patent publication number 2000-280923.

In the prior art electric power steering device, housings 91, 92 are attached by a bolt 93, and a rack bar 94 is disposed in the housings 91, 92. The housing 91 is formed with a motor attachment section 91a that projects diagonally relative to the rack bar 94. A motor 95 is secured to the motor attachment section 91a, and the motor shaft 95a of the motor 95 is in a diagonally intersecting relationship with the rack bar 94. Power transmitting means is disposed between the motor shaft 95a and the rack bar 94. More specifically, a drive gear 96, in the form of a bevel gear with teeth extending in a linear direction, forms a serration fit or a spline fit with the motor shaft 95a. A shaft section 96a of the drive gear 96 is rotatably supported by bearings 97 disposed between it and the motor attachment section 91a. A spacer 98 is interposed between a head 96b of the drive gear 96 and the inner ring of the bearing 97. Also, a ball screw mechanism 99 is disposed coaxially on the rack bar 94, and a nut 99a of the ball screw mechanism 99 is rotatably supported by a bearing 82 disposed between it and the housing 92. A driven gear 82 is secured to the nut 99a of the ball screw mechanism 99 and a driven gear 82 meshes with the drive gear 96. Driven gear 82 is formed as a bevel gear having teeth extending in a linear direction. A spacer 83 is interposed between the driven gear 82 and the inner ring of the bearing 81.

In the prior art electric power steering device of FIG. 8, the motor shaft 95a of the motor 95 is rotated based on steering torque generated by a steering shaft not shown in the figures. The rotational drive force of the motor shaft 95a is transferred to the nut 99a of the ball screw mechanism 99 by the drive gear 96 and the driven gear 82. The rotational motion of the nut 99a is converted by the ball screw mechanism 99 into longitudinal linear motion of the rack bar 94. Thus, the drive gear 96, the ball screw mechanism 99, and the driven gear 82, which serve as power transmission means transfer the rotational drive force from the motor shaft 95a to the rack bar 94 as auxiliary propulsion. As a result, the rotational motion of the steering shaft is converted to longitudinal linear motion of the rack bar 94 with the assistance of the motor 95, thus allowing the steering angle to be changed. Also, the spacer 98 disposed at the motor 95 and the spacer 83 disposed at the ball screw mechanism 99 serve to adjust the backlash between the drive gear 96 and the driven gear 82.

This type of conventional electric power steering device has the spacer disposed at the motor and the spacer disposed at the ball screw which provides stepwise adjustments in backlash. Non-stepped adjustments in backlash are not possible between the drive gear and the driven gear. More specifically, the backlash between the drive gear and the driven gear cannot be adjusted unless multiple spacers having different thicknesses are prepared and mounted in different combinations until the drive gear and the driven gear are at predetermined dimensions from a reference position determined ahead of time. Thus, the prior art electric power steering device involves tedious assembly work as well as a larger number of maintenance parts and higher production costs.

The above, and other objects, features and advantages of the present invention will become apparent from the following description read in conjunction with the accompanying drawings, in which like reference numerals designate the same elements.

OBJECTS AND SUMMARY OF THE INVENTION

The object of the present invention is to overcome the problems of the conventional technology described above and to provide an electric power steering device that can simplify assembly, reduce the number of maintenance parts, and lower production costs.

An electric power steering device according to the present invention includes a rack bar converting a rotational motion of a steering shaft to a longitudinal, linear motion and changing a steering angle; a motor rotationally driving a motor shaft based on a steering torque generated by the steering shaft, the motor shaft forming a diagonal intersection with the rack bar; and drive transmission means transmitting a rotational drive from the motor shaft to the rack bar as an auxiliary propulsion force.

The drive transmitting means is formed from a drive gear rotating in tandem with the motor shaft and formed as a bevel gear with linearly extending teeth; a ball screw mechanism disposed co-axial with the rack bar and converting rotational motion to linear motion; and a driven gear rotating in tandem with a nut of the ball screw mechanism, meshing with and moving in tandem with the drive gear, and formed as a bevel gear with linearly extending teeth. Backlash for the drive gear or the driven gear or backlash between the drive gear and the driven gear can be adjusted in a continuous, non-stepped manner.

The electric power steering device of the present invention includes the motor shaft and the rack bar diagonally intersecting each other. The drive gear and the driven gear of power transmission means are formed from a bevel gear with linearly extending teeth. Examples of bevel gears with linearly extending teeth that can be used by the drive gear and the driven gear include bevel gears in which the linear tooth traces follow a line along the pitch cone, and spiral bevel gears in which the linear tooth traces form an angle with the pitch cone. Spiral bevel gears in which the tooth traces are curved cannot be used. Also, hypoid gears cannot be used for the drive gear and the driven gear. Thus, the backlash between the drive gear and the driven gear can be adjusted via one of the elements. The backlash adjustments can be made in a continuous, non-stepping manner, and the conventional, stepped method of making adjustments with spacers is not used. For this reason, there is no need to adjust backlash by trying different spacers, as in the conventional method.

Thus, the electric power steering device of the present invention provides easy assembly and reduces the number of maintenance parts. Furthermore, the production costs can be lowered.

According to another aspect of an electric power steering device according to the present invention, the drive gear and/or the driven gear can be secured after being moved in the axial direction. As described above, the motor shaft and the rack bar form a diagonal intersection, and the drive gear and the driven gear of power transmission means is formed from bevel gears with linearly extending teeth. Thus, by forming the drive gear and/or the driven gear in this manner, the position of one of the elements can be adjusted in a non-stepped, continuous manner to adjust the backlash between the two elements. By securing the drive gear and/or the driven gear in this manner, a backlash that is suitable for operation can be easily maintained, thus reducing changes in power transmission properties while also reducing noise. For these reasons, it is preferable to allow both the drive gear and the driven gear to be secured after being moved in the axial direction.

When the drive gear and/or the driven gear are secured after being moved in the axial direction, a serration fit or a spline fit can be formed in the housing between the motor shaft and the drive gear, and the drive gear can be rotatably supported by an inner housing that can be moved in the axial direction relative to the housing before it is secured to the housing. With a serration fit or a spline fit between the motor shaft and the drive gear in the housing, the drive gear can be moved in the axial direction, thereby absorbing backlash. By allowing the inner housing to be moved axially relative to the housing before it is secured to the housing and by allowing the drive gear to be rotatably supported by the inner housing, the securing of the inner housing to the housing allows the drive gear to be secured at a position where it can absorb backlash.

To allow the drive gear to be rotatably supported by the inner housing, it would be preferable to have the drive gear formed from a shaft section and a head section, with shaft section of the drive gear being supported by a bearing disposed on the inner housing. As a result, the rotational torque of the drive gear can be reduced, shaft wavering of the drive gear can be reduced, and high-precision, high-endurance transmission that is also quiet can be provided.

To secure the inner housing to the housing, internal threads can be formed on the inner surface of the housing, external threads meshing with these internal threads can be formed on the outer surface of the inner housing, and the inner housing can be screwed to the housing. The drive gear can be moved in the axial direction to a position where backlash can be absorbed, and then a lock nut can be screwed to the external threads of the inner housing so that the lock nut is abutted against the housing. The lock nut secures the inner housing, and the drive gear is secured at a position where backlash can be absorbed.

Alternatively, when the drive gear and/or the driven gear is set up to be secured after being moved in the axial direction, the nut and the driven gear can be formed integrally in the housing, and the driven gear can be rotatably supported by the inner housing, which is secured to the housing after being moved axially relative to the housing. If the nut and the driven gear are formed integrally in the housing, the number of parts can be reduced while the drive gear can be moved axially, and backlash can be absorbed. By allowing the inner housing to move axially relative to the housing before it is secured to the housing, and by allowing the driven gear to be rotatably supported by the inner housing, the inner housing can be secured to the housing and the driven gear can be secured at a position where backlash is absorbed.

The inner housing can be secured to the housing by having internal threads formed on the inner surface of the housing and having external threads meshing with these internal threads formed on the outer surface of the inner housing. The inner housing is screwed to the housing so that the driven gear is moved axially to a position where it can absorb backlash. Then, a lock nut is screwed to the external threads of the inner housing, and the lock nut is abutted against the housing. The lock nut secures the inner housing and the driven gear is secured at a position where it absorbs backlash.

According to another aspect, the drive gear and/or the driven gear can be formed so that a section of the teeth faces can be moved along the pitch circle. With this structure, the section of the teeth faces of the drive gear and/or the driven gear can provide continuous, non-stepped adjustment of the backlash between the two elements.

In this case, the drive gear and/or the driven gear can be formed from a first gear forming a section of the teeth faces, a second gear forming the remaining teeth faces, and biasing means biasing the first gear and the second gear away from or toward each other along the pitch circle. With this structure, in the drive gear and/or the driven gear, the first gear and the second gear are biased by biasing means away from or toward each other, allowing continuous, non-stepped adjustment of the backlash between the two elements. Thus, a backlash suitable for operation is maintained while changes in transmission properties and noise are reduced.

The electric power steering device according to the present invention preferably has the housing include a grease reservoir disposed below the drive gear and the driven gear to store grease. This prevents shortages of grease to the drive gear and the driven gear, allowing the drive gear and the driven gear to be maintenance-free.

Another embodiment of the electric power steering device according to the present invention preferably has a seal disposed between the ball screw mechanism and the drive gear and the driven gear to provide a sealing effect. When different types of grease are used in the ball screw mechanism and the drive gear and the driven gear, the seal prevents the grease from mixing, thus preventing reduction in the performance of the ball screw mechanism, the drive gear, and the driven gear. When the ball screw mechanism, the drive gear, and the driven gear use the same grease, the seal can still be effective. More specifically, the seal can prevent grease containing contaminants such as wear residue generated by the drive gear and the driven gear from entering the ball screw mechanism, thus preventing reduced performance in the ball screw mechanism.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

[List of Designators]

94: rack bar; 95a: motor shaft; 95: motor; 6, 96. 9b, 19b, 29b, 9, 19, 29: drive transfer means (6, 96: drive gear; 9b, 19b, 29b: driven gear; 9, 19, 29: ball screw mechanism); 9a, 19a, 29a: nut; 1, 2, 11, 12: housing; 1b, 11b: grease reservoir; 8: seal; 22: first gear (medium-diameter section); 21, 23: second gear (21: large-diameter section; 23: small-diameter section); 25, 27: biasing means (coil spring)

DETAILED DESCRIPTION OF THE PREFERRED EMBODIMENTS

Embodiments of the present invention will be described using FIG. 1 through FIG. 7.

Figure 1:
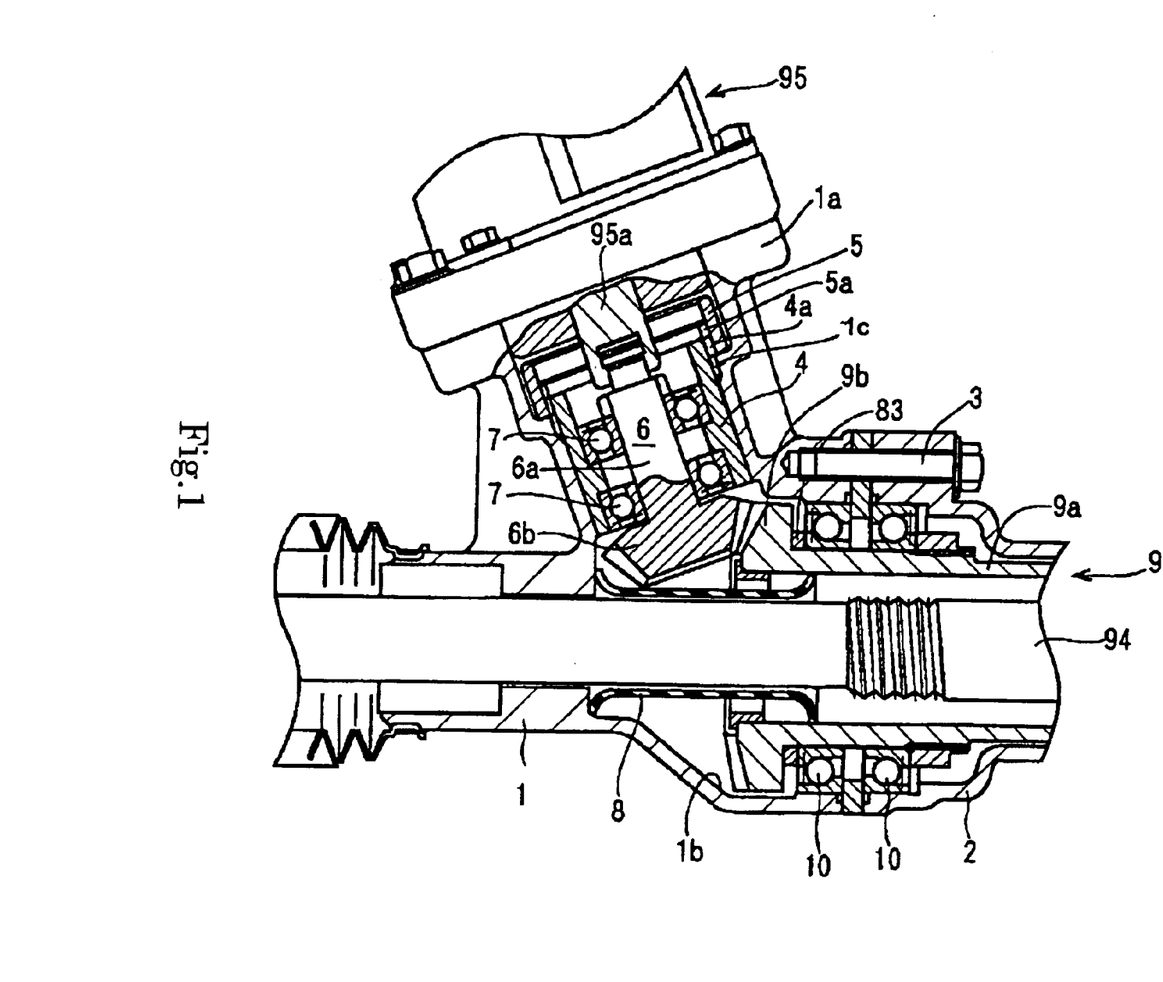
FIG. 1 is a cross-section drawing of an electric power steering device according to a first embodiment.

FIG. 1 shows the mechanical structure of an electric power steering device according to a first embodiment. Elements having a structure identical to those of the conventional electric power steering device from FIG. 8 are referred to using the same numerals.

An electric power steering device includes housings 1, 2 secured by a bolt 3 and a rack bar 94 is disposed in the housings 1, 2. The housing 1 is formed with a motor attachment section 1a projecting diagonally relative to the rack bar 94. A motor 95 is secured to the motor attachment section 1a, and a motor shaft 95a of the motor 95 is in a diagonally intersecting relationship with the rack bar 94. The motor shaft 95a forms a serration fit or a spline fit with a drive gear 6 formed as a bevel gear with linearly extending teeth. The drive gear 6 is formed from a shaft 6a and a head 6b.

Figure 2:
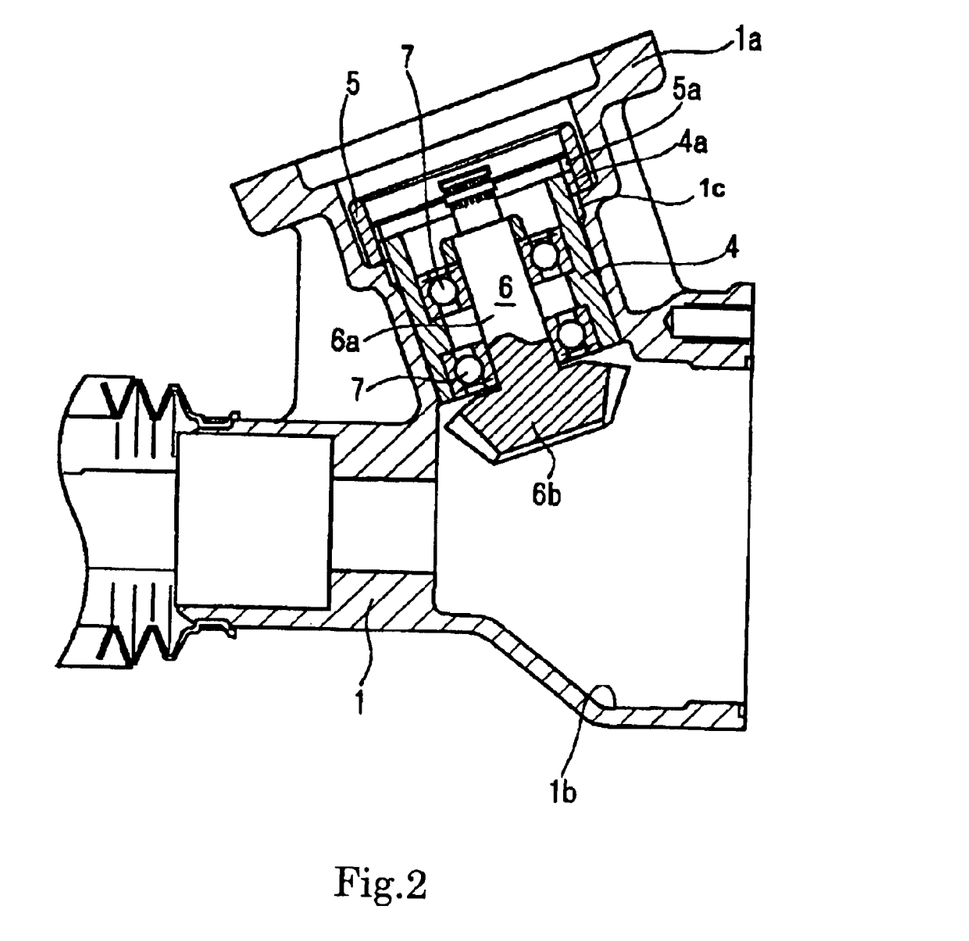
FIG. 2 is an assembly drawing of an electric power steering device according to a first embodiment.

As shown in FIG. 2, a cylindrical inner housing 4 disposed in the motor attachment section 1a is capable of moving in the axial direction. A shaft 6a of the drive gear 6 is rotatably supported by a bearing 7 disposed between it and the inner housing 4. An internal thread 1a is formed on the inner surface of the motor attachment section 1a. An external thread 4a meshing with the internal thread 1a is formed on the outer surface of the inner housing 4. Also, a lock nut 5 on which is formed an interior thread 5a meshing with the external thread 4a is threaded to the inner housing 4.

As shown in FIG. 1, the housings 1, 2, include a ball screw mechanism 9 disposed co-axially on the rack bar 94. A nut 9a of the ball screw mechanism 9 is rotatably supported by a bearing 10 disposed between it and the housings 1, 2. The nut 9a of the ball screw mechanism 9 is formed integrally with a driven gear 9b having a bevel gear with linearly extending teeth and meshing with the drive. A spacer 83 is interposed between the driven gear 9b and the inner ring of the bearing 10.

Below the housing 1 is formed a grease reservoir 1b storing grease below the driven gear 9b. A is seal 8 is interposed between the ball screw mechanism 9 and the drive gear 6 and the driven gear 9b to seal these elements. In this structure, the drive gear 6, the driven gear 9b, and the ball screw mechanism 9 serve as power transmission means.

The electric power steering device according to the first embodiment described above can be made in the manner described below.

First, referring to FIG. 2, two bearings 7 are pushed into and secured to the inner housing 4. Then, the shaft 6a of the drive gear is secured to the inner rings of the bearings 7. Next, the inner housing 4 is screwed to the motor attachment section 1a of the housing 1 so that axial movement can be used to make adjustments to position the drive gear 6 for absorption of backlash. In this adjustment, a distance between the teeth edge of the head 6b of the drive gear 6 and a reference plane is set to a predetermined value. Then, the external threads 4a of the inner housing 4 are meshed with the lock nut 5, and the lock nut 5 is abutted against the motor adjustment section 1a. Thus, the lock nut 5 secures the inner housing 4 to the motor attachment section 1a, and the drive gear 6 is secured to a position where it can absorb backlash.

Then, the nut 9a of the ball screw mechanism 9 shown in FIG. 1 and the driven gear 9b are assembled. In this operation, the backlash between the drive gear 6 and the driven gear 9b is adjusted by switching the spacers 83. If the drive gear 6 has already been assembled in a precise manner, the backlash adjustment can be performed relatively easily.

Finally, the seal 8, the rack bar 94, the motor 95, the housing 2, and the like are assembled, completing the electric power steering device. In this manner, in this electric power steering device, the backlash between the drive gear 6 and the driven gear 9b can be adjusted before the motor 95 is assembled.

In this electric power steering device, the attachment position of the drive gear 6 can be adjusted in a non-stepping manner, thus eliminating the stepwise adjustments made for the drive gear 6 using spacers in the conventional technology. Thus, when assembling the drive gear 6, there is no need to perform adjustments by trying out different spacers as in the conventional technology.

As a result, the electric power steering device allows easy assembly and reduces the number of parts that needs to be managed while reducing production costs.

Also, the electric power steering device is formed so that the drive gear 6 can be secured after it has moved in the axial direction. Thus, it is easier to maintain backlash, which is desirable for operation, while power transmission properties tend to vary less and less noise is generated.

Furthermore, in this electric power steering device, there is the grease reservoir 1b below the drive gear 6 and the driven gear 9b. Thus, shortages of grease for the drive gear and the driven gear 9b are prevented.

Also, a seal 8 is disposed between the ball screw mechanism 9 and the drive gear 6 and the driven gear 9b. When different types of grease are used in the ball screw mechanism 9 and the drive gear 6 and the driven gear 9b, the seal 8 can prevent the greases from mixing, thus preventing deterioration of the characteristics of the ball screw mechanism 9, the drive gear 6, and the driven gear 9b. Also, when the same grease is used for the ball screw mechanism 9 and the drive gear 6 and the driven gear 9b, the seal 8 can prevent grease containing debris, e.g., particles resulting from wear, from entering the ball screw mechanism 9, thus preventing deterioration of the characteristics of the ball screw mechanism 9.

Figure 3:
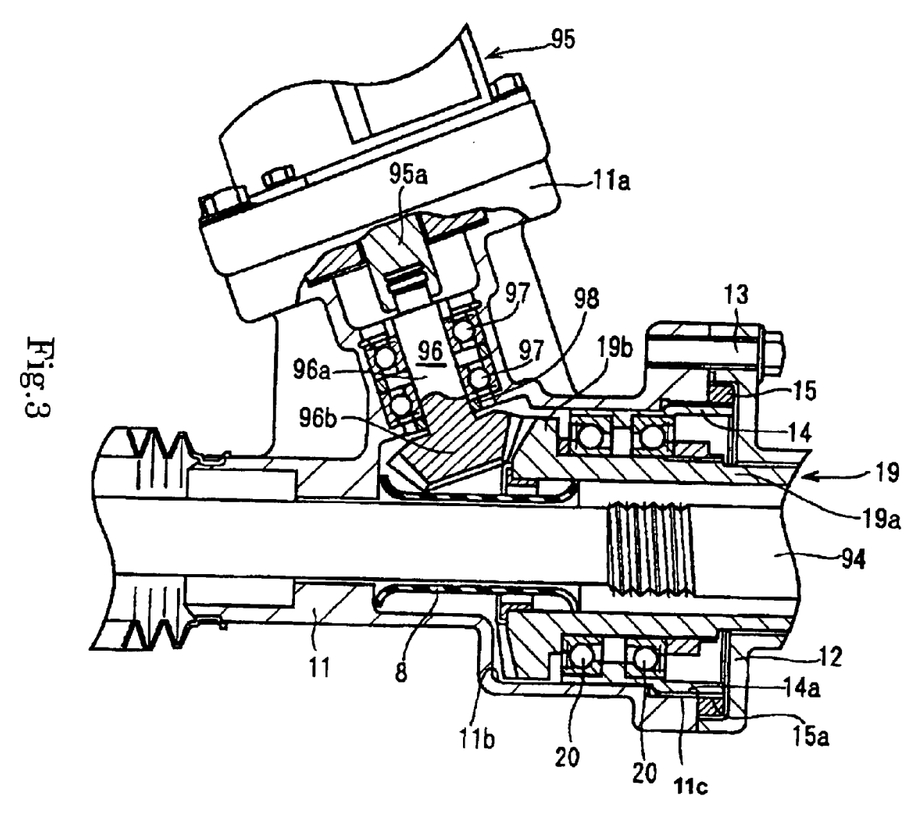
FIG. 3 is a cross-section drawing of an electric power steering device according to a second embodiment.

FIG. 3 shows the mechanical structure of an electric power steering device according to a second embodiment. As above, the elements identical to those of the conventional electric power steering device are assigned the same designators and their descriptions will be omitted.

According to the second embodiment of an electric power steering device, housings 11, 12 are secured with a bolt 13, and a rack bar 94 is disposed in the housings 11, 12. Also, the housing 11 includes a motor attachment section 11a projecting diagonally relative to the rack bar 94. A motor 95 is secured to the motor attachment section 11a, and the motor shaft 95a of the motor 95 forms a diagonal intersection with the rack bar 94.

Figure 4:
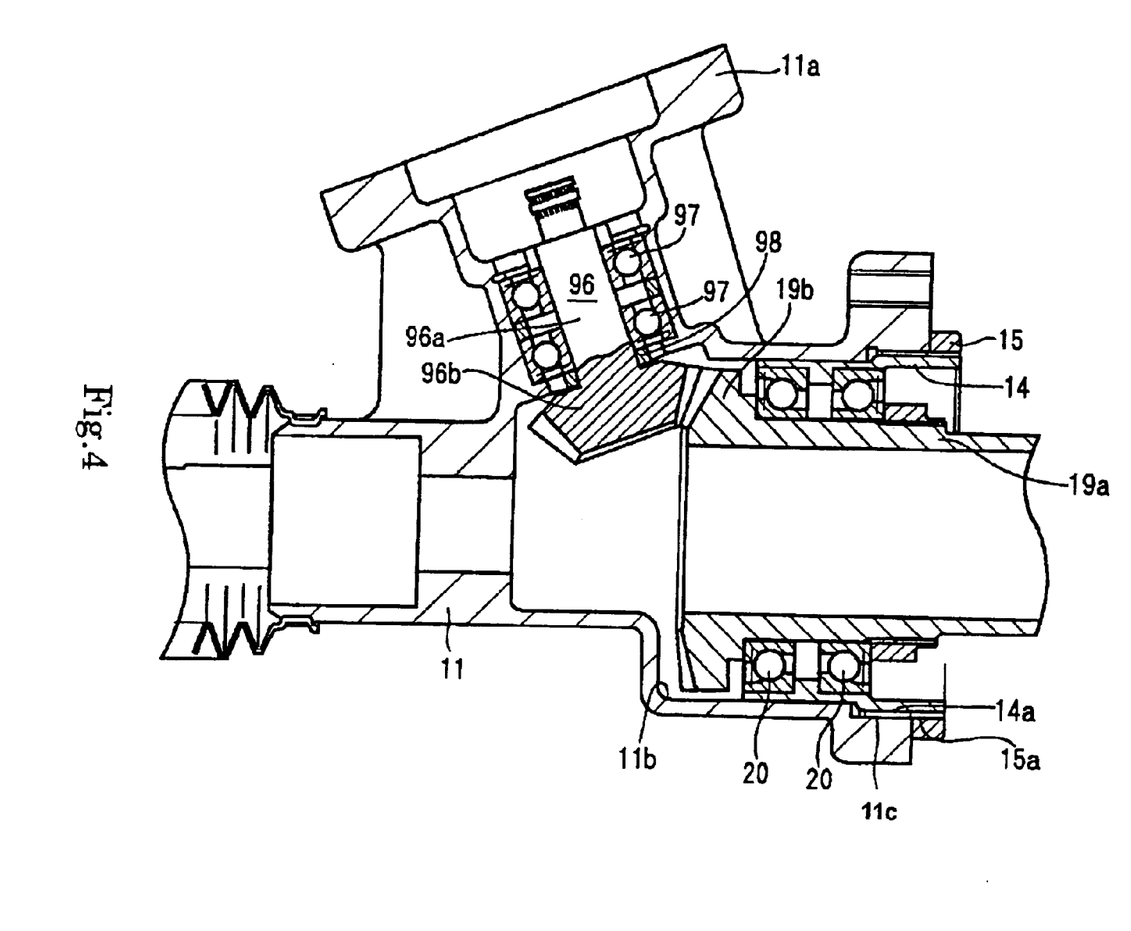
FIG. 4 is an assembly drawing of an electric power steering device according to a second embodiment.

The housings 11, 12, include a ball screw mechanism 19 disposed co-axial with the rack bar 94. Also, as shown in FIG. 4, a cylindrical inner housing 14 is disposed so that it can move in the axial direction. A nut 19a of the ball screw mechanism 19 is rotatably supported by bearings 20 disposed between it and the housing 14. The nut 19a of the ball screw mechanism 19 is formed integrally with a driven gear 19b having a bevel gear with linearly extending teeth meshing with a drive gear 96. Internal threads 11a are formed on the inner surface of the housing 11, and external threads 14a meshing with the internal threads 11a are formed on the outer surface of the inner housing 14. Also, a lock nut 15 on which are formed internal threads 15a meshing with the external threads 14a is screwed to the inner housing 14.

A grease reservoir 11b is disposed below the housing 11 to store grease below the driven gear 19b. Also, a seal 8 is disposed between the ball screw mechanism 19 and the drive gear 96 and the driven gear 19b to form a seal. In this structure, the drive gear 96, the drive gear 19b, and the ball screw mechanism 19 form drive transmission means. Other aspects of the structure are the same as the conventional electric power steering device.

The electric power steering device described above is made in the following manner.

First, as shown in FIG. 4, two bearings 97 are pushed into and secured to the motor attachment section 11a of the housing 11. Then, the shaft 96a of the drive gear 96 is secured to the inner rings of the bearings 97. Different spacers 98 are tried until a predetermined distance is established between the teeth edge of the head 96b of the drive gear 96 and a reference plane.

The two bearings 20 are pressed into the inner housing 14. The nut 19a of the ball screw mechanism 19 is secured to the inner rings of the bearings 20. Next, the inner housing 14 is screwed to the housing 11 so that it is moved in the axial direction and the backlash between the drive gear 96 and the driven gear 19b is adjusted. Then, the lock nut 15 is screwed to the external threads 14a of the inner housing 14, and the lock nut 15 is abutted against the housing 11. In this manner, the lock nut 15 secures the inner housing 14 to the housing 11 and secures the driven gear 19b to a position that absorbs backlash.

Finally, the seal 8, the rack bar 94, the motor 95, the housing 12, and the like are assembled, and the electric power steering device is completed. Thus, the electric power steering device of the present invention allows the backlash of the drive gear 96 and the driven gear 19b to be adjusted before the motor 95 is mounted.

The electric power steering device of the present invention allows the attachment position of the driven gear 19b to be adjusted in a continuous, non-stepping manner. Unlike the conventional technology, the driven gear 19b is not adjusted in a stepped manner using spacers. As a result, when the driven gear 19b is assembled, there is no need to make adjustments while trying different spacers as in the conventional technology.

Thus, an electric power steering device allows easy assembly and reduces the number of parts that needs to be managed, and also reduces production costs. Other operations and advantages are as described in the first embodiment.

Also, in the second embodiment the inner housing 4, the lock nut 5, and the drive gear 6 in the first embodiment can be used. This eliminates the need to assemble the drive gear while trying different spacers 98, and makes adjusting the backlash of the drive gear and the driven gear easier.

Figure 5:
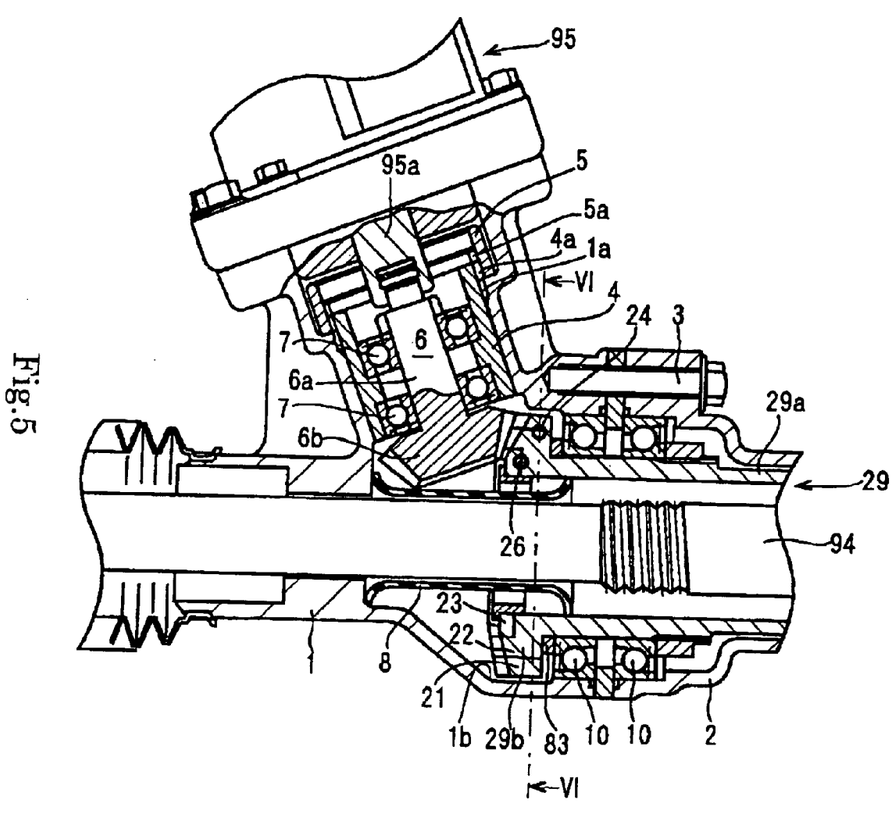
FIG. 5 is a cross-section drawing of an electric power steering device according to a third embodiment.

FIG. 5 shows the mechanical structure of an electric power steering device according to a third embodiment. The basic mechanical structure of the electrical power steering device is similar to that shown in FIG. 1, and elements that are identical to those from the first embodiment shown in FIG. 1 are assigned the same numerals and the corresponding descriptions will be omitted.

Referring to the third embodiment, the nut 29a of the ball screw mechanism 29 is formed integrally with a driven gear 29b formed with a bevel gear having linearly extending teeth meshing with the drive gear 6. The driven gear 29b is formed in three sections: a large-diameter section 21; a medium-diameter section 22; and a small-diameter section 23. Also formed are scissors mechanisms 24, 26.

Figure 6:
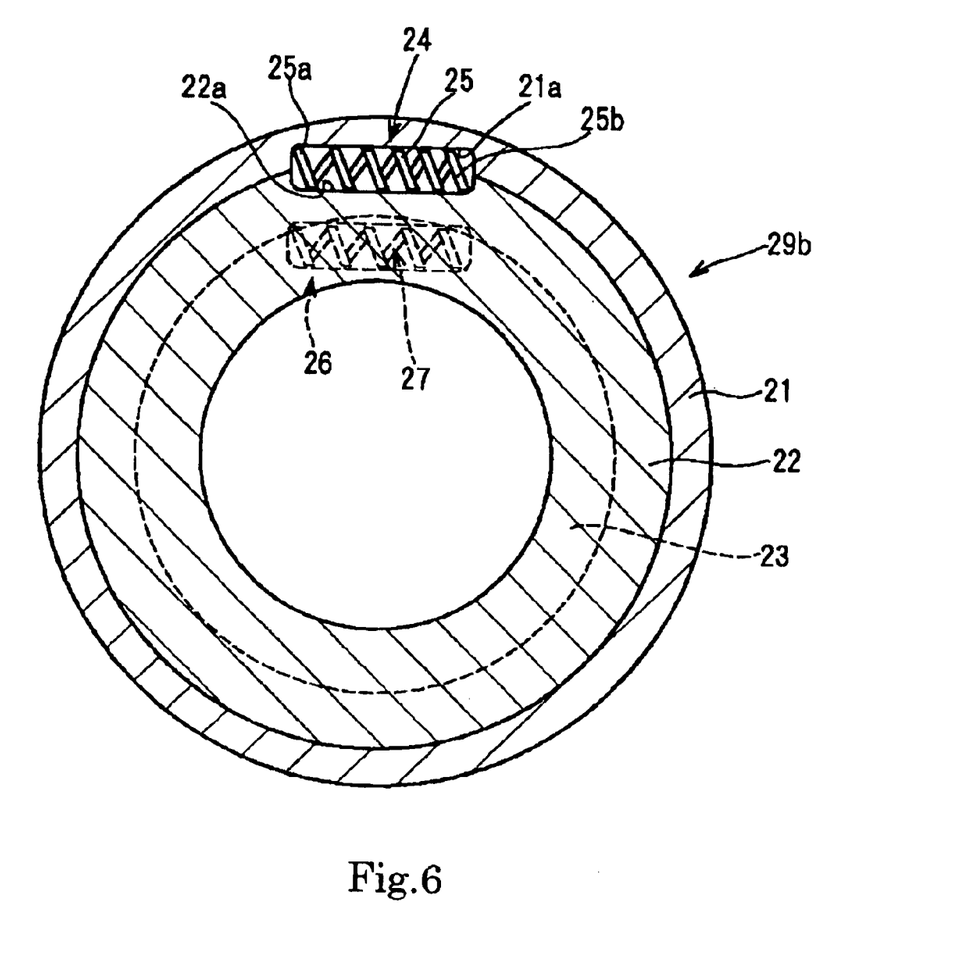
FIG. 6 is a drawing of an electric power steering device according to a third embodiment as seen from the VI—VI line in FIG. 5.

The scissors mechanism 24, as shown in FIG. 6, is formed from a cavity 21a formed on the large-diameter section 21 and disposed between the large-diameter section 21 and the medium-diameter section 22; a cavity 22a formed on the medium-diameter section 22 and disposed between the large-diameter section 21 and the medium-diameter section 22; and a coil spring 25 mounted in the cavities 21a, 22a. A first end 25a of the coil spring 25 is secured to the cavity 21a of the large-diameter section 21 and a second end 25b is secured to the cavity 22a of the medium-diameter section 22. A compressive force is pre-applied to the coil spring 25 so that the teeth face of the large-diameter section 21 and the teeth face of the medium-diameter section 22 are biased away from each other along a pitch circle. The coil spring serves as biasing means, the medium-diameter section 22 serves as the first gear, and the large-diameter section 21 serves as the second gear.

The scissors mechanism 26 has a structure similar to that of the scissors mechanism 24 disposed between the medium-diameter section 22 and the small-diameter section 23. A tensile load is pre-applied to the coil spring 27 used in the scissors mechanism 26. As a result, the teeth face of the medium-diameter section 22 and the teeth face of the small-diameter section 23 are biased toward each other along a pitch circle. In this case, the coil spring 27 serves as biasing means, the medium-diameter section 22 serves as the first gear, and the small-diameter section 23 serves as the second gear. The other elements are the same as those of the first embodiment.

The scissors mechanisms 24, 26 disposed for the driven gear 29b are able to remove backlash between the drive gear 6 and the driven gear 29b regardless of the direction of rotation. Other operations and advantages are similar to those of the first embodiment.

In addition to the embodiments described above, the seal 8 shown in FIG. 1 and FIG. 5 is used as the seal between the ball screw mechanism and the drive gear and the driven gear. However, it is possible to improve sealing properties by using shield bearings for the bearings 10, 20 supporting the nuts 9a, 19a, 29a.

Figure 7:
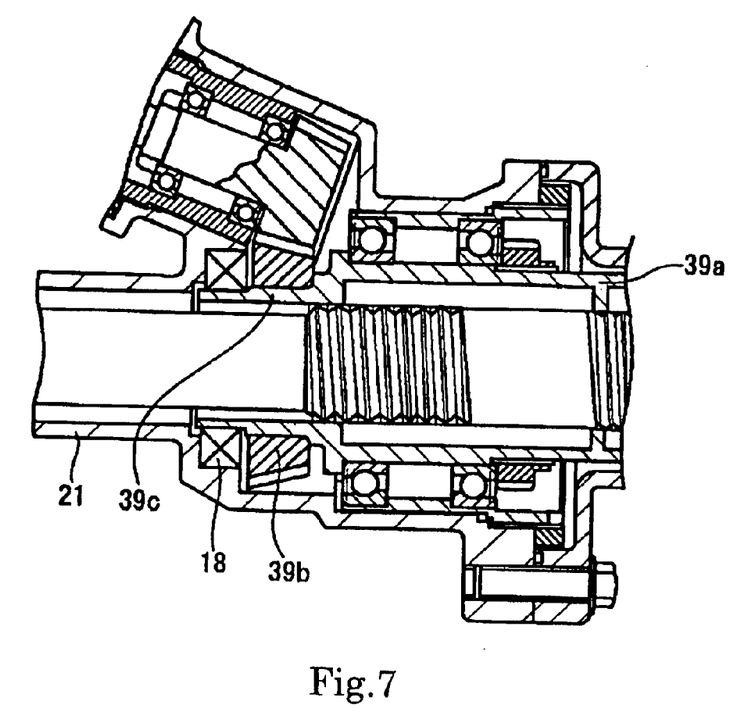
FIG. 7 is a cross-section drawing of an alternative example of an electric power steering device.

Also, as shown in FIG. 7, it is possible to use an extender 39c to extend the nut 39a of the ball screw mechanism 39 further to the left in the figures compared to the embodiments described above. A sealing ring 18 can then be disposed between this extender 39c and the housing 21. There is also shown a driven gear 39b attached to the extender 39c.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electric power steering device comprising:
   a rack bar converting a rotational motion of a steering shaft to a longitudinal, linear motion and changing a steering angle;
   a motor rotationally driving a motor shaft based on a steering torque generated by said steering shaft, said motor shaft forming a diagonal intersection with said rack bar; and
   drive transmission means transmitting a rotational drive from said motor shaft to said rack bar as an auxiliary propulsion force;
   said drive transmitting means comprising:
   a drive gear rotating in tandem with said motor shaft and formed as a bevel gear with linearly extending teeth;
   a ball screw mechanism disposed co-axial with said rack bar and converting rotational motion to linear motion;
   and a driven gear rotating in tandem with a nut of said ball screw mechanism, meshing with and moving in tandem with said drive gear, and formed as a bevel gear with linearly extending teeth; and
   backlash for said drive gear or said driven gear or backlash between said drive gear and said driven gear can be adjusted in a continuous, non-stepped manner.

2. The electric power steering device as described in claim 1, wherein at least one of said drive gear and said driven gear is secured after being moved in an axial direction.

3. The electric power steering device as described in claim 2, wherein said motor shaft and said drive gear form one of a serration fit and a spline fit, and said drive gear is rotatably supported by an inner housing secured to said housing after being moved in an axial direction relative to said housing.

4. The electric power steering device as described in claim 2, wherein said nut and said driven gear are integral within said housing, and said driven gear is rotatably supported by an inner housing secured to said housing after being moved in an axial direction relative to said housing.

5. The electric power steering device as described in claim 1, wherein at least one of said teeth of said drive gear and said teeth of said driven gear is movable along a pitch circle.

6. The electric power steering device as described in claim 1, wherein at least one of a section of said teeth of said drive gear and a section of said teeth of said driven gear is movable along a pitch circle.

7. An electric power steering device as described in claim 5, wherein at least one of said drive gear and said driven gear is formed from a first gear serving as a section of a teeth face, a second gear serving as a remaining section of a teeth face, and biasing means biasing said first gear and said second gear toward or away from each other along a pitch circle.

8. An electric power steering device as described in claim 6 wherein at lest one of said drive gear and said driven gear is formed from a first gear serving as a section of a teeth face, a second gear serving as a remaining section of a teeth face, and biasing means biasing said first gear and said second gear toward or away from each other along a pitch circle.

9. An electric power steering device as described in claim 2, wherein said housing includes a grease reservoir, disposed below said drive gear and said driven gear, storing grease.

10. An electric power steering device as described in claim 3, wherein said housing includes a grease reservoir, disposed below said drive gear and said driven gear, storing grease.

11. An electric power steering device as described in claim 4, wherein said housing includes a grease reservoir, disposed below said drive gear and said driven gear, storing grease.

12. An electric power steering device as described in claim 5, wherein said housing includes a grease reservoir, disposed below said drive gear and said driven gear, storing grease.

13. An electric power steering device as described in claim 6, wherein said housing includes a grease reservoir, disposed below said drive gear and said driven gear, storing grease.

14. An electric power steering device as described in claim 7, wherein said housing includes a grease reservoir, disposed below said drive gear and said driven gear, storing grease.

15. An electric power steering device as described in claim 8, wherein said housing includes a grease reservoir, disposed below said drive gear and said driven gear, storing grease.

16. An electric power steering device as described in claim 1, wherein a seal is disposed between said ball screw mechanism and said drive gear and said driven gear to provide a sealing effect.

17. An electric power steering device as described in claim 2, wherein a seal is disposed between said ball screw mechanism and said drive gear and said driven gear to provide a sealing effect.

18. An electric power steering device as described in claim 3, wherein a seal is disposed between said ball screw mechanism and said drive gear and said driven gear to provide a sealing effect.

19. An electric power steering device as described in claim 4, wherein a seal is disposed between said ball screw mechanism and said drive gear and said driven gear to provide a sealing effect.

20. An electric power steering device as described in claim 5, wherein a seal is disposed between said ball screw mechanism and said drive gear and said driven gear to provide a sealing effect.

21. An electric power steering device as described in claim 6, wherein a seal is disposed between said ball screw mechanism and said drive gear and said driven gear to provide a sealing effect.

22. An electric power steering device as described in claim 7, wherein a seal is disposed between said ball screw mechanism and said drive gear and said driven gear to provide a sealing effect.

23. An electric power steering device as described in claim 8, wherein a seal is disposed between said ball screw mechanism and said drive gear and said driven gear to provide a sealing effect.

24. An electric power steering device as described in claim 9, wherein a seal is disposed between said ball screw mechanism and said drive gear and said driven gear to provide a sealing effect.

25. An electric power steering device as described in claim 10, wherein a seal is disposed between said ball screw mechanism and said drive gear and said driven gear to provide a sealing effect.

26. An electric power steering device as described in claim 11, wherein a seal is disposed between said ball screw mechanism and said drive gear and said driven gear to provide a sealing effect.

27. An electric power steering device as described in claim 12, wherein a seal is disposed between said ball screw mechanism and said drive gear and said driven gear to provide a sealing effect.

28. An electric power steering device as described in claim 13, wherein a seal is disposed between said ball screw mechanism and said drive gear and said driven gear to provide a sealing effect.

29. An electric power steering device as described in claim 14, wherein a seal is disposed between said ball screw mechanism and said drive gear and said driven gear to provide a sealing effect.

30. An electric power steering device as described in claim 15, wherein a seal is disposed between said ball screw mechanism and said drive gear and said driven gear to provide a sealing effect.

* * * * *